(12) United States Patent
Lopez et al.

(10) Patent No.: US 12,470,932 B2
(45) Date of Patent: Nov. 11, 2025

(54) SECURITY IN RELATION TO A MALICIOUSLY CONTROLLED RECEIVER

(71) Applicant: Telefonaktiebolaget LM Ericsson (publ), Stockholm (SE)

(72) Inventors: Miguel Lopez, Aachen (DE); Athanasios Stavridis, Malmö (SE); Rocco Di Taranto, Lund (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 81 days.

(21) Appl. No.: 18/689,259

(22) PCT Filed: Dec. 11, 2021

(86) PCT No.: PCT/EP2021/085334
§ 371 (c)(1),
(2) Date: Mar. 5, 2024

(87) PCT Pub. No.: WO2023/036454
PCT Pub. Date: Mar. 16, 2023

(65) Prior Publication Data
US 2024/0373229 A1    Nov. 7, 2024

(30) Foreign Application Priority Data

Sep. 8, 2021 (GR) .............................. 20210100590

(51) Int. Cl.
*H04W 12/122* (2021.01)
*H04W 12/02* (2009.01)
(Continued)

(52) U.S. Cl.
CPC ......... *H04W 12/122* (2021.01); *H04W 12/02* (2013.01); *H04W 24/08* (2013.01); *H04W 64/006* (2013.01); *H04W 84/12* (2013.01)

(58) Field of Classification Search
CPC ... H04W 12/122; H04W 12/02; H04W 24/08; H04W 64/006; H04W 84/12; H04W 52/42; H04W 80/02; H04B 17/309
See application file for complete search history.

(56) References Cited

U.S. PATENT DOCUMENTS

2005/0171720 A1    8/2005   Olson et al.
2018/0295519 A1   10/2018   Nandha Premnath et al.

FOREIGN PATENT DOCUMENTS

EP         3869223 A1     8/2021

OTHER PUBLICATIONS

International Search Report and Written Opinion dated May 19, 2022 for International Application No. PCT/EP2021/085334 filed Dec. 11, 2021, consisting of 12 pages.
(Continued)

*Primary Examiner* — Mohammed Waliullah
(74) *Attorney, Agent, or Firm* — Weisberg I.P. Law, P.A.

(57) ABSTRACT

Transmission of one or more packets in a communication environment. Each packet includes one or more channel measurement fields, and the one or more packets together comprising at least first and second channel measurement fields. A first transmitter configuration for the first channel measurement field and a second transmitter configuration for the second channel measurement field are selected. The first and second transmitter configurations include pseudo-randomly different phase and/or amplitude shifts for the channel measurement fields. A method is also disclosed for a receiver configured to perform measurements on one or more packets in a communication environment. The first transmitter configuration for the first channel measurement field and the second transmitter configuration for the second channel measurement field are handshaked with a transmitter of the one or more packets, the one or more packets are
(Continued)

received, and measurements performed on the received packets for wireless sensing and/or wireless positioning.

20 Claims, 2 Drawing Sheets

(51) Int. Cl.
*H04W 24/08* (2009.01)
*H04W 64/00* (2009.01)
*H04W 84/12* (2009.01)

(56) References Cited

OTHER PUBLICATIONS

Kim, T., et al., Online Detection of Fake Access Points using Received Signal Strengths, 2012 IEEE 75th Vehicular Technology Conference (VTC Spring 2012): Yokohama, Japan, May 6-9, 2012, IEEE, Piscataway, NJ, May 6, 2012, consisting of 5 pages.

802.11 Working Group of the LAN/MAN Standards Committee of the IEEE Computer Society, IEEE P802.11axTM/D6.0, Draft Standard for Information technology- Telecommunications and information exchange between systems Local and metropolitan area networks—Specific requirements, Nov. 2019, consisting of 780 pages.

Da Silva, C., IEEE P802.11 Wireless LANs, 802.11 SENS SG Proposed PAR, Jan. 14, 2020, Intel, consisting of 4 pages.

Li, Q., et al., IEEE P802.11 Wireless LANs, [802.11az PHY Spec Text for Adaptation of Secure LTF Sequence to Bandwidth/Antenna Change], Intel Corporation, Mar. 5, 2019, consisting of 8 pages.

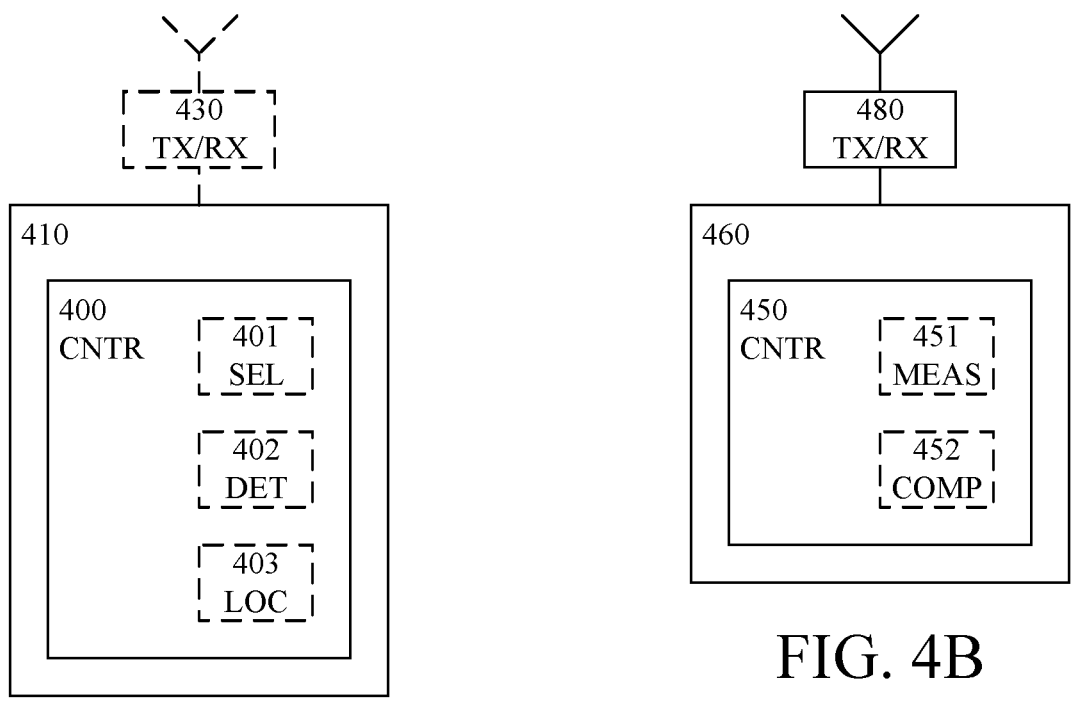
FIG. 4A
FIG. 4B
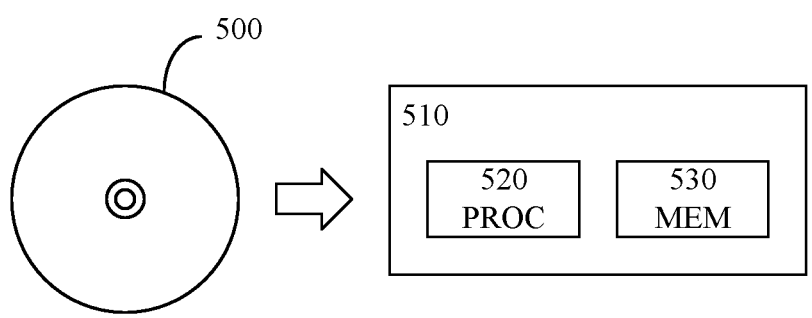
FIG. 5

SECURITY IN RELATION TO A MALICIOUSLY CONTROLLED RECEIVER

CROSS-REFERENCE TO RELATED APPLICATIONS

This application is a Submission Under 35 U.S.C. § 371 for U.S. National Stage Patent Application of International Application No.: PCT/EP2021/085334, filed Dec. 11, 2021 entitled "SECURITY IN RELATION TO A MALICIOUSLY CONTROLLED RECEIVER," which claims priority to Greek Application No.: GR20210100590, filed Sep. 8, 2021, the entireties of both of which are incorporated herein by reference.

TECHNICAL FIELD

The present disclosure relates generally to the field of transmission and reception of one or more packets in a communication environment. More particularly, it relates to security when a maliciously controlled receiver (e.g., a sensing receiver and/or a positioning receiver) performs measurements on the one or more packets.

BACKGROUND

Packets transmitted in a communication environment (e.g., an unlicensed communication environment) may, in some scenarios, be used for wireless positioning and/or wireless sensing.

Wireless positioning can be performed by timing detection. To this end, a positioning receiver device receives physical layer packets transmitted by a positioning transmitter device, and performs timing measurements thereon. The measurements are used for position determination of absolute and/or relative position of transmitter and/or of the positioning receiver.

Wireless positioning may be seen as an enhancement for radio technologies that have been designed primarily for communication. For example, the IEEE 802.11 Working Group has initiated the task group 802.11az with the purpose of developing a standard amendment to support wireless positioning (next generation positioning, NGP). The IEEE 802.11az amendment is developed based on the IEEE 802.11ax High Efficiency (HE) amendment.

Wireless sensing can be performed by detecting changes in a wireless propagation channel via wireless sensing measurements. To this end, a sensing receiver device receives multiple physical layer packets transmitted by a transmitter device, and performs measurements thereon. The measurements are used to detect and/or classify the occurrence of events.

Wireless sensing may be seen as an enhancement for radio technologies that have been designed primarily for communication. For example, the IEEE 802.11 Working Group has initiated the task group 802.11bf with the purpose of developing a standard amendment to support wireless sensing. It is expected that the IEEE 802.11 version of wireless sensing will build on the IEEE 802.11az amendment since many of the particulars of wireless positioning are also relevant for wireless sensing.

It is a problem that a device under malicious control may be able to utilize packet transmission in a communication environment for malicious purposes in the context of wireless sensing and/or wireless positioning.

Therefore, there is a need for improved security in the context of wireless sensing and/or wireless positioning.

SUMMARY

It should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Generally, when an arrangement is referred to herein, it is to be understood as a physical product; e.g., an apparatus. The physical product may comprise one or more parts, such as controlling circuitry in the form of one or more controllers, one or more processors, or the like.

It is an object of some embodiments to solve or mitigate, alleviate, or eliminate at least some of the above or other disadvantages.

A first aspect is a method for transmission of one or more packets in a communication environment. Each packet comprises one or more channel measurement fields, and the one or more packets together comprise at least first and second channel measurement fields.

The method comprises selecting a first transmitter configuration for the first channel measurement field and a second transmitter configuration for the second channel measurement field, wherein the first and second transmitter configurations comprise pseudo-randomly different phase and/or amplitude shifts for the channel measurement fields.

In some embodiments, a difference between average communication reception performance for the first and second transmitter configurations is less than a threshold value for communication reception performance.

In some embodiments, the first and second channel measurement fields are comprised in a single packet.

In some embodiments, the first and second channel measurement fields are comprised in different packets.

In some embodiments, selecting the first and second transmitter configurations comprises selecting a plurality of transmitter configurations for a plurality of respective channel measurement fields, wherein the plurality of transmitter configurations comprise pseudo-randomly different phase and/or amplitude shifts for the channel measurement fields.

In some embodiments, the first and second transmitter configurations comprise one or more of: different mappings between transmitter chain inputs and antenna ports, different collections of antenna ports being active, different cyclic shifts, different phase shifts, different power allocations among transmitter chains, and different precoding settings.

In some embodiments, the method further comprises transmitting the one or more packets using the selected transmitter configurations for the channel measurement fields.

In some embodiments, the transmission of the one or more packets is for communication.

In some embodiments, the transmission of the one or more packets is for wireless sensing measurements and/or wireless positioning measurements.

In some embodiments, the method further comprises handshaking the selected transmitter configurations with one or more receivers.

In some embodiments, the method further comprises determining that a privacy enhancement mode is applicable, and selecting the transmitter configurations for the channel measurement fields is responsive to determining that the privacy enhancement mode is applicable.

In some embodiments, determining that the privacy enhancement mode is applicable is performed by a physical layer and comprises receiving a command indicative of privacy mode applicability from a higher layer.

In some embodiments, selecting the transmitter configurations is for increasing security by degrading a temporal coherence of measurements performed on the one or more packets by a maliciously controlled receiver.

In some embodiments, the transmission of the one or more packets is in accordance with an IEEE 802.11 standard.

In some embodiments, each packet is one or more of: a physical layer conformance procedure—PLCP—protocol data unit (PPDU), a high efficiency (HE) PPDU, a control packet, a beacon packet, a request-to-send (RTS) packet, a clear-to-send (CTS) packet, and an acknowledgement (ACK) packet.

In some embodiments, the channel measurement fields include one or more of: a training field, a long training field (LTF), a short training field (STF), and a legacy preamble field.

In some embodiments, the method further comprises localizing channel measurement fields within the one or more packets by detecting spatial mapping variations.

In some embodiments, the pseudo-randomly different phase and/or amplitude shifts are for at least one subcarrier used for transmission.

In some embodiments, the communication environment is an unlicensed communication environment.

A second aspect is a method for a receiver configured to perform measurements on one or more packets in a communication environment. Each packet comprises one or more channel measurement fields, and the one or more packets together comprise at least first and second channel measurement fields.

The method comprises handshaking a first transmitter configuration for the first channel measurement field and a second transmitter configuration for the second channel measurement field with a transmitter of the one or more packets, wherein the first and second transmitter configurations comprise pseudo-randomly different phase and/or amplitude shifts for the channel measurement fields.

The method also comprises receiving the one or more packets, and performing measurements on the received packets for wireless sensing and/or wireless positioning, wherein performing the measurements comprises compensating for the different phase and/or amplitude shifts.

A third aspect is a computer program product comprising a non-transitory computer readable medium, having thereon a computer program comprising program instructions. The computer program is loadable into a data processing unit and configured to cause execution of the method according to any of the first and second aspects when the computer program is run by the data processing unit.

A fourth aspect is an apparatus for controlling transmission of one or more packets in a communication environment. Each packet comprises one or more channel measurement fields, and the one or more packets together comprise at least first and second channel measurement fields.

The apparatus comprises controlling circuitry configured to cause selection of a first transmitter configuration for the first channel measurement field and a second transmitter configuration for the second channel measurement field, wherein the first and second transmitter configurations comprise pseudo-randomly different phase and/or amplitude shifts for the channel measurement fields.

A fifth aspect is a transmitter device comprising the apparatus of the fourth aspect.

A sixth aspect is a control node comprising the apparatus of the fourth aspect.

A seventh aspect is an apparatus for a receiver configured to perform measurements on one or more packets in a communication environment. Each packet comprises one or more channel measurement fields, and the one or more packets together comprise at least first and second channel measurement fields.

The apparatus comprises controlling circuitry configured to cause handshaking of a first transmitter configuration for the first channel measurement field and a second transmitter configuration for the second channel measurement field with a transmitter of the one or more packets, wherein the first and second transmitter configurations comprise pseudo-randomly different phase and/or amplitude shifts for the channel measurement fields.

The controlling circuitry is also configured to cause reception of the one or more packets, and performance of measurements on the received packets for wireless sensing and/or wireless positioning, wherein performance of the measurements comprises compensation for the different phase and/or amplitude shifts.

An eighth aspect is a receiver device comprising the apparatus of the seventh aspect.

In some embodiments, any of the above aspects may additionally have features identical with or corresponding to any of the various features as explained above for any of the other aspects.

An advantage of some embodiments is that improved security is provided in the context of wireless sensing and/or wireless positioning.

An advantage of some embodiments is that a receiver device under malicious control experiences an additional obstacle to be able to utilize packet transmission in a communication environment for malicious purposes in the context of wireless sensing and/or wireless positioning.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

FIG. 4A is a schematic block diagram illustrating an example apparatus according to some embodiments;

FIG. 4B is a schematic block diagram illustrating an example apparatus according to some embodiments; and FIG. 5 is a schematic drawing illustrating an example computer readable medium according to some embodiments.

DETAILED DESCRIPTION

As already mentioned above, it should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

It should be noted that, even though some exemplification herein relates to communication in relation to IEEE 802.11 standards, application of the principles described herein is not limited thereto. Contrarily, some embodiments may be equally applicable in relation to other wireless communication standards (e.g., 3GPP standards).

A transmitter device as referred to herein may be a radio access node or a user device, for example. A receiver device as referred to herein may be a user device or a radio access node, for example.

A radio access node may be any suitable radio access node (e.g., an access point (AP), an access point station (AP-STA), a base station (BS), a NodeB, a gNB, etc.).

A user device may be any suitable user device (e.g., a station (STA), a non-AP-STA, a user equipment (UE), etc.).

Generally, when a packet is referred to herein, it may be interpreted as a physical layer packet, for example. Typically, a packet referred to herein may be a self-contained physical layer (PHY) packet. A self-contained PHY packet may be defined as a PHY packet that carries all information necessary for a receiver to handle it properly. Proper handling may, for example, include detection and decoding of the packet by an intended receiver. Alternatively or additionally, proper handling may include detection of the packet by receiver(s) other than an intended receiver, and deferral from transmission—typically via suitable network allocation vector (NAV) settings. Yet alternatively or additionally, proper handling may include detection of the packet by sensing/positioning receiver(s), and performance of measurements for sensing and/or positioning.

In the following, embodiments will be described where improved security is provided in the context of wireless sensing and/or wireless positioning.

Figure 1:
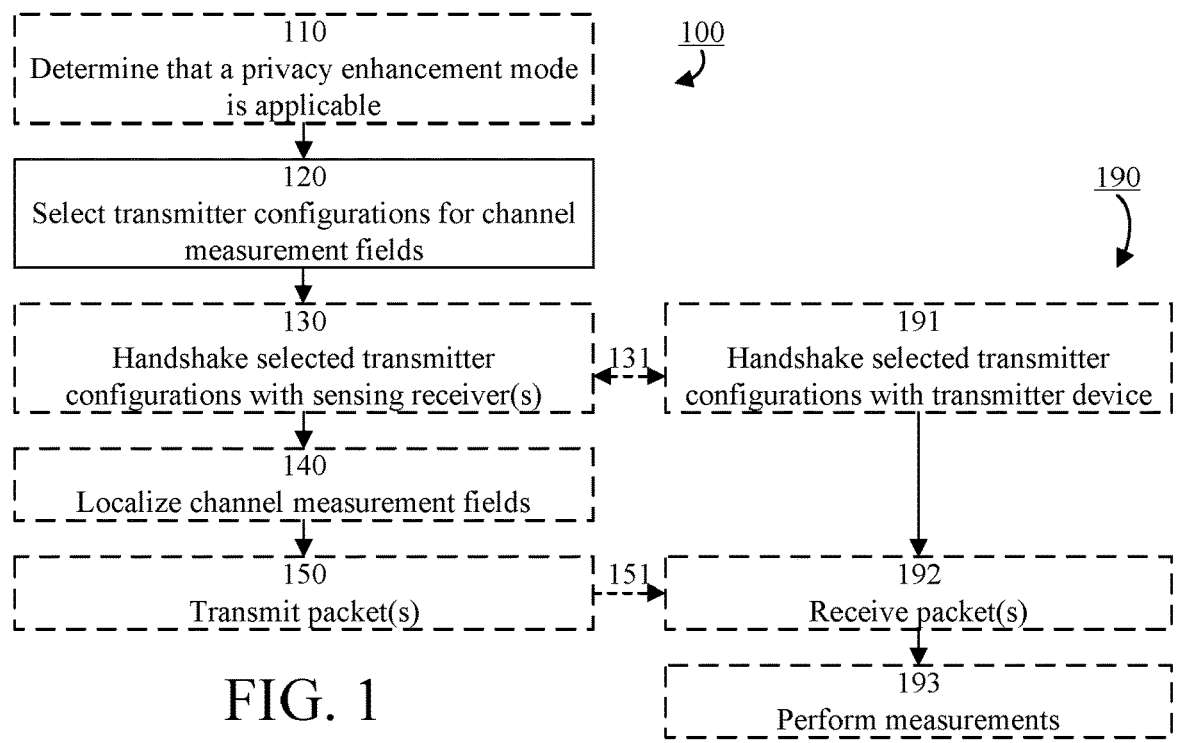
FIG. 1 is a flowchart illustrating example method steps according to some embodiments.

FIG. 1 illustrates an example method 100 according to some embodiments. The method 100 is for transmission of one or more packets in a communication environment (e.g., an unlicensed communication environment). In some embodiments, the method 100 is performed by a transmitter device configured to transmit the one or more packets. In some embodiments, the method 100 is performed by a control node configured to control a transmitter device configured to transmit the one or more packets.

The transmission of the one or more packets may be for communication (e.g., the packets may be data carrying packets). Alternatively or additionally, the transmission of the one or more packets may be for wireless sensing measurements and/or wireless positioning measurements (e.g., the packets may be packets of a sensing session). Alternatively or additionally, the transmission of the one or more packets may be for other purposes (e.g., beacon packets).

Each packet comprises one or more channel measurement fields, and the one or more packets together comprise at least first and second channel measurement fields. The first and second channel measurement fields may be comprised in a single packet or in different packets. Typically, the one or more packets together comprise a plurality of channel measurement fields.

The transmission of the one or more packets may be in accordance with an IEEE 802.11 standard (e.g., IEEE 802.11be, IEEE 802.11bf, IEEE 802.11az, etc.) or a third generation partnership project (3GPP) standard, for example.

Each packet may be a PLCP (physical layer conformance procedure) protocol data unit (PPDU), a high efficiency (HE) PPDU, a control packet, a beacon packet, a request-to-send (RTS) packet, a clear-to-send (CTS) packet, an acknowledgement (ACK) packet, or any suitable combination thereof.

Example channel measurement fields include training fields, any long training fields (LTFs; e.g., HE-LTF, high throughput (HT) LTF, very high throughput (VHT) LTF), short training fields (STFs), legacy preamble fields (e.g., one or more of the fields L-STF, L-LTF, L-SIG, RL-SIG; as exemplified later herein in connection with FIG. 2).

As illustrated by step 120, the method 100 comprises selecting transmitter configurations for (respective) channel measurement fields. At least, a first transmitter configuration is selected for the first channel measurement field and a second transmitter configuration for the second channel measurement field. Typically, a plurality of transmitter configurations are selected for a plurality of respective channel measurement fields.

At least some of the selected transmitter configurations comprise pseudo-randomly different phase and/or amplitude shifts for the channel measurement fields. Thus, at least the first and second transmitter configurations comprise pseudo-randomly different phase and/or amplitude shifts for the channel measurement fields. Typically, a plurality of transmitter configurations are used that comprise pseudo-randomly different phase and/or amplitude shifts for the channel measurement fields. Two or more channel measurement fields may have the same selected transmitter configuration in some embodiments (e.g., when there are more channel measurement fields than possible transmitter configurations).

When the packets are orthogonal frequency division multiplexing (OFDM) packets, the pseudo-randomly different phase and/or amplitude shifts may be applicable for one or more of the subcarriers used for transmission.

Due to the pseudo-randomly different phase and/or amplitude shifts, any channel measurements performed on the channel measurement fields by a receiver device that has no knowledge of the selected transmitter configurations become cumbersome to use for sensing and/or positioning.

For example, the pseudo-randomly different phase and/or amplitude shifts may result in that a completely static channel appears—based on the channel measurements—to be varying between two channel measurement fields. Thus, the channel measurements may not be particularly useful for sensing purposes. In this sense, the selection of the transmitter configurations may result in increased security by degrading a temporal coherence of measurements performed on the one or more packets by a maliciously controlled receiver.

Alternatively or additionally, the pseudo-randomly different phase and/or amplitude shifts may result in that a distance between transmitter device and receiver device appears—based on the channel measurements—to be longer or shorter than it actually is. Thus, the channel measurements may not be particularly useful for positioning purposes.

According to some embodiments, the use of pseudo-randomly different phase and/or amplitude shifts is transparent from the viewpoint of a communication receiver (e.g., a receiver that receives and processes a packet to retrieve data carried by the packet). Thus, statistically, the link performance and/or the link budget may be the same (or sufficiently similar) for different phase and/or amplitude shifts. For example, the pseudo-randomly different phase and/or amplitude shifts may result in the same (or sufficiently similar) channel estimation metric (e.g., channel state information, CSI) to be applied for communication settings (e.g., modulation and coding scheme, MCS).

Thus, statistically, an absolute-valued difference between average communication reception performance for the first and second transmitter configurations may be less than a threshold value for communication reception performance. When the communication reception performance is unchanged, it may be seen as using a threshold value equal to zero.

The pseudo-randomly different phase and/or amplitude shifts may be accomplished in any suitable way. For example, the transmitter configurations with different phase and/or amplitude shifts may comprise different mappings between transmitter chain inputs and antenna ports, different collections of antenna ports being active, different cyclic shifts, different phase shifts (for the transmitter), different power allocations among transmitter chains (while the total transmission power is not necessarily—typically not—changed), different precoding settings (e.g., different phase and/or amplitude for beamforming side lobes, while the main lobe is not necessarily—typically not—changed; at least not substantially), or any suitable combination thereof. It should be noted that the difference is between transmitter configurations (i.e., between different channel measurement fields), while the same setting may be applied for all transmitter chains (e.g., same cyclic shift for all transmitter chains and/or same phase shift for all transmitter chains).

In the example of different mappings between transmitter chain inputs and antenna ports, the channel is changed. Therefore either or both of different phase shifts and different amplitude shifts can occur.

In the example of different collections of antenna ports being active, the channel is changed. Therefore either or both of different phase shifts and different amplitude shifts can occur.

In the example of different cyclic shifts, different time delays are applied for different transmit chains. This aims at combating any undesired beamforming effect. Therefore either or both of different phase shifts and different amplitude shifts can occur.

In the example of different phase shifts, the phase of the transmitted signal is changed which leads to that the interference situation (e.g., constructive/destructive) may change at the receiver. Therefore either or both of different phase shifts and different amplitude shifts can occur.

In the example of different transmit power, the amplitude of the received signal is affected. Therefore different amplitude shifts can occur.

In the example of different precoding, either or both of different phase shifts and different amplitude shifts can occur for the sidelobes.

The change of transmitter configurations may be occurring between each packet and/or within a packet, or may be occurring with lower frequency. The transmitter configuration may be changed periodically (using a fixed or dynamic period) and/or based on a triggering event. For example, the transmitter configuration may be changed for each beacon interval.

In some embodiments (e.g., when the method 100 is performed by a transmitter device), the method 100 may also comprise transmitting the one or more packets using the selected transmitter configurations for the channel measurement fields, as illustrated by optional step 150.

If there are one or more receivers that are authorized to use the packets for sensing and/or positioning, the method 100 may further comprise handshaking the selected transmitter configurations with such receivers before transmission of the packets, as illustrated by optional step 130. The term handshaking should be interpreted broadly, including execution of a negotiation protocol between the transmitter device and the receiver device, as well as the transmitter device indicating the selected transmitter configurations to the receiver device.

In some embodiments, the method 100 comprises localizing channel measurement fields within the one or more packets before transmission, as illustrated by optional step 140.

Typically, at least some channel measurement fields may be localized by detecting spatial mapping variations within a packet (e.g., a legacy preamble may be transmitted without beamforming while other parts of the packet are transmitted using beamforming). For example, step 140 may comprise determining a location in a packet where the spatial mapping is changed, and/or determining which part (e.g. legacy preamble) of a packet (e.g., a PPDU) is spatially mapped to the transmit antennas to avoid unintentional beamforming.

Alternatively or additionally, localizing channel measurement fields within the one or more packets may be based on which type of medium access control (MAC) frames are carried by the packet, since different MAC frames may have different locations of channel measurements fields. This may be applicable, for example, for non-HT PPDUs carrying management frames (e.g., beacons) and/or non-HT PPDUs carrying control frames (e.g., RTS, CTS, ACK, etc.).

It should be noted that, generally, the different transmitter configurations for different channel measurement fields may be applied for all packets from a transmitter device, or only to some packets from a transmitter device. In one example, when a plurality of packets are transmitted in a sensing session, the different transmitter configurations for different channel measurement fields may be applied; e.g., to all packets of the session, only to some packets of the session, and/or only to packets of a session. In one example, when beacon packets are transmitted, the different transmitter configurations for different channel measurement fields may be applied; e.g., to all beacon packets, only to some beacon packets, and/or only to beacon packets.

In some embodiments, the method 100 comprises determining that a privacy enhancement mode is applicable, as illustrated by optional step 110. Then, execution of the rest of the method 100 may be responsive to determining that the privacy enhancement mode is applicable. For example, determining that the privacy enhancement mode is applicable may be performed by a physical layer and comprise receiving a command indicative of privacy mode applicability from a higher layer.

As mentioned before, the use of pseudo-randomly different phase and/or amplitude shifts is typically transparent from the viewpoint of a communication receiver, while affecting the performance of a sensing and/or positioning receiver. The latter archives the purpose that a receiver device under malicious control experiences an additional obstacle to be able to utilize channel measurements for malicious purposes in the context of wireless sensing and/or wireless positioning. However, when there are one or more receivers that are authorized to use the packets for sensing and/or positioning, such receivers may be configured to handle the pseudo-randomly different phase and/or amplitude shifts.

To this end, some embodiments provide a method for a receiver configured to perform measurements on one or more packets in a communication environment (e.g., the one or more packets transmitted in step 150 of FIG. 1), as illustrated in FIG. 1 by an example method 190. In some embodiments, the method 190 is performed by a receiver device configured to receive the one or more packets.

The method 190 comprises handshaking a first transmitter configuration for a first channel measurement field and a second transmitter configuration for a second channel measurement field with the transmitter of the one or more packets as illustrated by step 191, wherein the first and second transmitter configurations comprise pseudo-randomly different phase and/or amplitude shifts for the channel measurement fields.

The method 190 also comprises receiving the one or more packets, as illustrated by step 192, and performing measurements on the received packets for wireless sensing and/or wireless positioning, as illustrated by step 193. Performing the measurements comprises compensating for the different phase and/or amplitude shifts. Thereby, the receiver can use the channel measurements for sensing and/or positioning as if the different transmitter configurations were not applied.

FIG. 1 also shows some example signaling between transmitter and receiver device, wherein signaling associated with the handshaking is illustrated at 131 and the signaling associated with the communication (transmission and reception) of the one or more packets is illustrated at 151.

Various embodiments will now be further exemplified in the context of wireless local area network (WLAN) sensing according to IEEE 802.11 standards.

In some approaches, sensing may be based on making statistical inferences based on channel estimates. For example, a burst of packets (e.g., a sensing session) may be sent by a transmitter device, measurements may be performed (e.g., on channel measurement fields) by a sensing receiver to achieve channel estimations (e.g., channel state information, CSI), and artificial intelligence (AI) machine learning (ML) techniques may be applied to detect and classify changes in the propagation environment. Thus, a sensing receiver typically performs a plurality of channel estimations over some time interval (e.g., a time interval where the one or more packets are transmitted).

Generally, packets (e.g., PPDUs) used for sensing may also carry data, and the recipient of the data may be the sensing receiver or another receiver.

For reception of data carried by the packets, it is typically not important whether or not the transmitter configuration is varying between channel measurements. For sensing to work properly, however, the transmitter configuration should preferably be kept constant from one channel measurement to the next, since a sensing receiver is typically not able to distinguish between causes of channel estimation changes; variations in the propagation environment or modifications of the transmitter configuration. This is utilized by some embodiments to pose an obstacle to maliciously controlled sensing receivers by varying the transmitter configuration between channel measurements. Authorized sensing receivers are informed about the transmitter configuration variations (compare with the handshaking described in connection with FIG. 1), and can compensate for them to achieve proper sensing performance.

Figure 2:
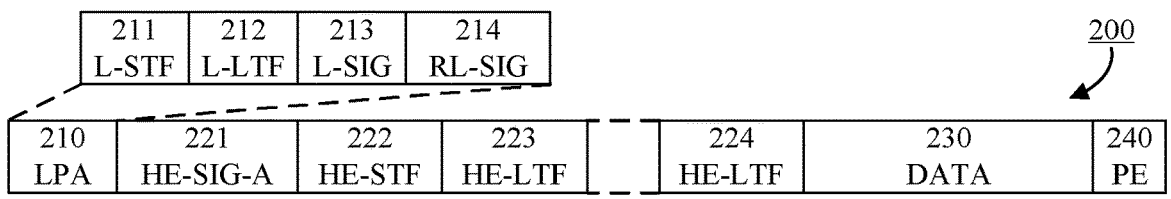
FIG. 2 is a schematic drawing illustrating an example packet structure according to some embodiments.

FIG. 2 schematically illustrates the structure of an example packet 200 according to some embodiments. The packet 200 is a high efficiency (HE) single user (SU) PLCP protocol data unit (PPDU). The packet 200 comprises (e.g., consists of) a legacy preamble (LPA) 210, a HE preamble, a data portion (DATA) 230, and a packet extension (PE) 240.

The legacy preamble comprises (e.g., consists of) a legacy short training field (L-STF) 211, a legacy long training field (L-LTF) 212, a legacy signal field (L-SIG) 213, and a repeated legacy signal field (RL-SIG) 214.

The HE preamble comprises (e.g., consists of) a HE signal field (HE-SIG-A) 221, a HE short training field (HE-STF) 222, and one or more HE long training fields (HE-LTF) 223, 224.

The legacy preamble parts 211, 212, 213 are typically used for all orthogonal frequency division multiplexing (OFDM) based frames in IEEE 802.11 transmissions; irrespective of which generation of the standard the frame complies with. The legacy preamble part 214 is used to distinguish a HE PPDU from a previous generation PPDU. The LTFs (L-LTF and HE-LTF) are suitable (and intended) for channel estimation measurements.

Examples of channel measurement fields of the packet 200 include L-STF 211, L-LTF 212, HE-STF 222, HE-LTF 223, 224, and/or any midamble(s) comprised in the data field 230. In some embodiments, the entire legacy preamble is considered as a channel measurement field.

In communication under IEEE 802.11 (Wi-Fi) the preamble of the PPDU is used for packet detection, automatic gain control (AGC), frequency offset estimation, synchronization, indication of modulation and channel estimation. Thus, if a Wi-Fi receiver device is not able to decode the preamble portion of a signal it will stop listening to the transmission, or fails to receive the transmission correctly. In order to increase the probability that an intended Wi-Fi receiver can decode a PPDU, the preamble is typically transmitted using the most robust means available; e.g., lowest code rate available and lowest modulation order available.

In IEEE 802.11ax PPDUs, information regarding transmit opportunity (TXOP) duration is transmitted in the physical layer header (HE-SIG-A2 or HE-SIG-A3 fields). This information is used by stations in the neighborhood for NAV setting, so it is typically desirable to enable that all stations can decode these HE-SIG-A fields so that virtual carrier sensing works as intended.

In wireless sensing and/or wireless positioning, the preamble of the PPDU (e.g., the LTFs) and/or other channel measurement fields may be used to perform sensing/positioning measurements. Since the preamble is typically transmitted very robustly, it is possible for listening devices to perform such measurements at a comparatively large distance from the transmitter of the packet.

This may be an advantage when the listening device is a device in relation to which it is desirable to achieve measurements. However, when the listening device is a device under malicious control the comparatively large distance for measurements is a disadvantage.

One of the features added in the IEEE 802.11az amendment is termed secure HE-LTFs. The secure HE-LTFs should replace the default HE-LTFs 223, 224 in a HE PPDU whenever the HE PPDU is for performing a positioning measurement. The secure HE-LTFs are generated by using LTF scrambling, known only to the transmitter and the intended receiver. A purpose of the secure HE-LTFs is to prevent impersonation (e.g., spoofing attacks wherein the attacker can control the perception of range for the victim).

However, a potential problem in the context of sensing and/or positioning is that the legacy preamble typically needs to be sent without manipulations such as scrambling (since it is inherently required to be available for legacy receivers). The legacy preamble comprises potentially important information (e.g., the L-LTF) that an attacker might use for malicious purposes. Embodiments presented herein are suitable to address this problem.

This problem is relevant also for IEEE 802.11az since (even though the secure HE-LTFs mitigate attacks and eavesdropping) the legacy preamble is sent in its default format. Thereby, the legacy preamble provides synchronization information for an attacker which attempts to make a station (STA) appear closer to an access point (AP) than it actually is, and/or information suitable for channel estimations for an attacker which attempts to achieve sensing information.

Figure 3:
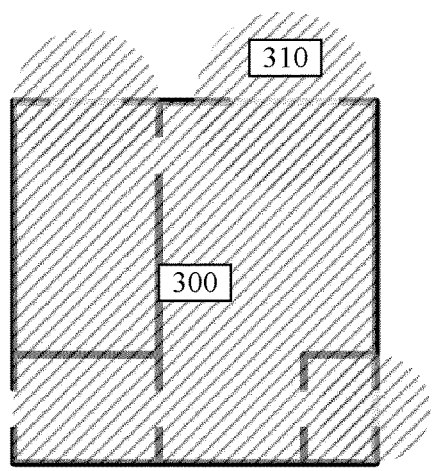
FIG. 3 is a schematic drawing illustrating an example scenario where some embodiments may be applicable.

FIG. 3 schematically illustrates an example effects scenario where some embodiments may be applicable. In FIG. 3, an apartment layout is schematically shown, wherein an access point (AP) 300 provides Wi-Fi within the apartment and the Wi-Fi coverage is illustrated by the diagonally striped area.

As illustrated in FIG. 3, the entire apartment has Wi-Fi coverage. However, the coverage extends through the windows, which makes it possible for a device 310 under malicious control to use the legacy preamble to perform measurements for sensing, for example.

For example, an attacker could acquire channel state information (CSI) by passively listening to transmissions originating inside the apartment, and—based on the CSI—infer whether there are people inside the apartment, how many they are, where they are, etc. Even if the WLAN is not being actively used, the AP beacons might suffice to achieve this.

To mitigate this problem, some embodiments suggest securing Wi-Fi transmissions by using different transmitter configurations for different channel measurement fields (wherein the difference may be within and/or between packets). This approach makes measurements performed on the channel measurement fields less useful for sensing and/or positioning.

The variations in the transmitter configuration may relate to varying phase and/or amplitude shifts.

The variations in the transmitter configuration may be pseudo-random, to make an unauthorized sensing receiver experience unpredictably varying channel conditions.

The transmitter configuration may be altered periodically (e.g., for every beacon interval) and/or aperiodically (e.g., at time intervals with random lengths); the latter to further confuse a maliciously operated receiver.

The transmitter configuration variations should typically still fulfil the requirements for the legacy preamble and/or the requirements for other fields necessary for proper handling (e.g., NAV setting) according to IEEE 802.11 standards. For example, the transmitter configuration variations should typically enable packet detection and decoding of physical layer headings (and possibly even the whole PPDU). This makes the transmitter configuration variations transparent to intended communication receivers and enables proper deferral of transmissions from potential interferers (e.g., receivers of basic service set, BSS, or overlapping BSS, OBSS). Thus, the variations of the transmitter configuration may be such that the performance of radio communication is essentially unchanged (e.g., no degradation in link performance). To achieve this, some embodiments exploit that IEEE 802.11 PPDUs are self-contained in the sense that they carry all the information necessary for a receiver to handle it properly as described earlier. In some embodiments, there is no signaling required to inform non-sensing/non-positioning receivers regarding the transmitter configuration alterations.

In one example, the variations in the transmitter configuration may be achieved by using different mappings between transmitter chain inputs and antenna ports in a multi-antenna transmitter device. Such different mappings do not affect the average link performance, but results in different channels.

This transmitter configuration alteration can be accomplished digitally (without switches or other analog components) by changing how data is mapped to transmitter chains. Alternatively or additionally, this transmitter configuration alteration can be accomplished using analog or hybrid (digital-analog) means.

A change in logical mapping from transmitter chain inputs to antenna ports may, for example, result in a change of which cyclic shifts are applied to some of the antennas (see, e.g., Table 21-10 below).

In one example, when a multi-antenna transmitter device does not utilize all its transmitter chains, the variations in the transmitter configuration may be achieved by changing which transmitter chains (or which antenna ports) are active for each packet.

In one example, the variations in the transmitter configuration may be achieved by using different cyclic shifts. For example, the varying transmitter configuration may be accomplished by introducing pseudo-random additional cyclic shifts to be applied for (all) the transmitter chains (on top of any otherwise stipulated cyclic shifts; see, e.g., Table 21-10 below). The same additional cyclic shift may be applied for all transmitter chains at each transmission time, while the additional cyclic shift changes (e.g., pseudo-randomly) over time.

An additional cyclic shift which is relatively small compared to any otherwise stipulated cyclic shift does not substantially affect the average link performance, but alters channel perception (e.g., resulting in variations of inferred distances). This may be particularly true when the duration of a cyclic prefix (CP) of an OFDM packet is large in comparison to a delay of the radio channel. For example, in IEEE 802.11ax the cyclic prefix may be 800 ns, 1.6 μs, or 3.2 μs, and a typical root mean square radio channel delay in an office building is less than 150 ns. Thus, introducing additional cyclic shifts of less than 50 ns does not affect the link performance substantially, but a sensing/positioning receiver will experience the same effect as if the position of the transmitter device had moved by up to 15 meters ($3 \cdot 10^8$ m/s multiplied by $50 \cdot 10^{-9}$ s).

In one example, the variations in the transmitter configuration may be achieved by using different (e.g., pseudo-random) phase shifts applied for (all) the transmitter chains. The same phase shift may be applied for all transmitter chains at each transmission time, while the phase shift changes (e.g., pseudo-randomly) over time.

In one example, the variations in the transmitter configuration may be achieved by using different (e.g., pseudo-random) power allocations among transmitter chains. Typically, such varying power allocation is done within an allowed power range (for each transmitter chain and/or for the transmitter device as a whole). For example, the power allocation may be varied for one or more of the transmitter chains while the total transmission power is not changed.

A change in power distribution among the transmitter chains does not substantially affect the average link performance (and a change in total transmission power is typically handled by link adaptation), but alters channel perception (e.g., changes the perceived pathloss).

In one example, the variations in the transmitter configuration may be achieved by using different precoding settings (i.e., different beamforming). This type of variation may be applied also between packets having the same intended receiver(s); e.g., by using different phase and/or amplitude for beamforming side lobes, while the main lobe is not substantially changed. The precoding setting variations may be pseudo-random. A maliciously operated receiver that does not receive the main lobe (or receives the main lobe at weak signal strength) will typically perceive channel variations that are actually due to the precoding setting variations. However, a maliciously operated receiver that receives the main lobe at reasonably high signal strength will typically not be adversely affected by this example approach.

Any suitable combination of two or more of the above examples is also possible according to some embodiments.

When an IEEE 802.11 AP has more than one transmitter chain (and, consequently, more than one antenna), the legacy preamble is spatially mapped to the transmitter chains, and the IEEE 802.11 standard mandates application of cyclic shift diversity (CSD) in order to avoid unintentional beamforming. Table 21-10 exemplifies such cyclic shift values to be applied to the legacy preamble.

The apparatus 410 comprises a controller (CNTR; e.g., controlling circuitry or a control module) 400.

The controller 400 is configured to cause selection of a first transmitter configuration for the first channel measurement field and a second transmitter configuration for the second channel measurement field, wherein the first and second transmitter configurations comprise pseudo-randomly different phase and/or amplitude shifts for the channel measurement fields (compare with step 120 of FIG. 1). For example, the controller 400 may be configured to cause selection of a plurality of transmitter configurations for a plurality of respective channel measurement fields, wherein the plurality of transmitter configurations comprise pseudo-randomly different phase and/or amplitude shifts for the channel measurement fields.

To this end, the controller 400 may comprise, or be otherwise associated with (e.g., connectable, or connected, to), a selector (SEL; e.g., selecting circuitry or a selection module) 401. The selector 401 may be configured to select the first and second transmitter configurations.

The controller 400 may also be configured to cause transmission of the one or more packets using the selected transmitter configurations for the channel measurement fields (compare with step 150 of FIG. 1).

To this end, the controller 400 may comprise, or be otherwise associated with (e.g., connectable, or connected, to), a transmitter (TX; e.g., transmitting circuitry or a transmission module); illustrated in FIG. 4A as part of a

TABLE 21-10

Cyclic shift values for L-STF, L-LTF, L-SIG, and VHT-SIG-A fields of the PPDU
$T_{CS}^{iTX}$ values for L-STF, L-LTF, L-SIG, and VHT-SIG-A fields of the PPDU

| Total number of transmit chains ($N_{TX}$) per frequency segment | Cyclic shift for transmit chain $i_{TX}$ (in units of ns) | | | | | | | |
|---|---|---|---|---|---|---|---|---|
| | 1 | 2 | 3 | 4 | 5 | 6 | 7 | 8 | >8 |
| 1 | 0 | — | — | — | — | — | — | — | — |
| 2 | 0 | −200 | — | — | — | — | — | — | — |
| 3 | 0 | −100 | −200 | — | — | — | — | — | — |
| 4 | 0 | −50 | −100 | −150 | — | — | — | — | — |
| 5 | 0 | −175 | −25 | −50 | −75 | — | — | — | — |
| 6 | 0 | −200 | −25 | −150 | −175 | −125 | — | — | — |
| 7 | 0 | −200 | −150 | −25 | −175 | −75 | −50 | — | — |
| 8 | 0 | −175 | −150 | −125 | −25 | −100 | −50 | −200 | — |
| >8 | 0 | −175 | −150 | −125 | −25 | −100 | −50 | −200 | Between −200 and 0 inclusive |

FIG. 4A schematically illustrates an example apparatus 410 according to some embodiments. The apparatus 410 is for controlling transmission of one or more packets in a communication environment. Each packet comprises one or more channel measurement fields, and the one or more packets together comprise at least first and second channel measurement fields.

In some embodiments, the apparatus 410 is comprisable (e.g., comprised) in a transmitter device configured to transmit the one or more packets. In some embodiments, the apparatus 410 is comprisable (e.g., comprised) in a control node configured to control a transmitter device configured to transmit the one or more packets. A control node may, for example, be a server node (e.g., configured to contribute to cloud based services), or a network node.

Alternatively or additionally, the apparatus 410 may be configured to cause execution of (e.g., execute) one or more steps of the method 100 of FIG. 1.

transceiver (TX/RX) 430. The transmitter may be configured to transmit the one or more packets using the selected transmitter configurations. This is particularly applicable when the apparatus 410 is comprisable in a transmitter device.

Alternatively, to this end, the controller 400 may comprise, or be otherwise associated with (e.g., connectable, or connected, to), an interface towards a transmitter device (e.g., interfacing circuitry or an interface module). The interface may be configured to convey an instruction to the transmitter device indicative of the selected transmitter configurations, thereby controlling the transmitter device to transmit the one or more packets using the selected transmitter configurations. This is particularly applicable when the apparatus 410 is comprisable in a control node.

The controller 400 may also be configured to cause handshaking of the selected transmitter configurations with one or more receivers (compare with step 130 of FIG. 1). The handshaking may be accomplished via a transceiver when the apparatus 410 is comprisable in a transmitter device and/or via an interface when the apparatus 410 is comprisable in a control node.

The controller 400 may also be configured to cause determination that a privacy enhancement mode is applicable (compare with step 110 of FIG. 1); the selection of the transmitter configurations then being responsive to determination that the privacy enhancement mode is applicable.

To this end, the controller 400 may comprise, or be otherwise associated with (e.g., connectable, or connected, to), a determiner (DET; e.g., determining circuitry or a determination module) 402. The determiner 402 may be configured to determine that a privacy enhancement mode is applicable.

The controller 400 may also be configured to cause localization of channel measurement fields within the one or more packets by detecting spatial mapping variations (compare with step 140 of FIG. 1).

To this end, the controller 400 may comprise, or be otherwise associated with (e.g., connectable, or connected, to), a localizer (LOC; e.g., localizing circuitry or a localization module) 403. The localizer 403 may be configured to localize channel measurement fields within the one or more packets by detecting spatial mapping variations.

It should be noted that features described in connection to the method 100 of FIG. 1 may be equally applicable in for the apparatus of FIG. 4A, even if not explicitly mentioned in connection thereto.

FIG. 4B schematically illustrates an example apparatus 460 according to some embodiments. The apparatus 460 is for a receiver configured to perform measurements on one or more packets in a communication environment. Each packet comprises one or more channel measurement fields, and the one or more packets together comprise at least first and second channel measurement fields.

In some embodiments, the apparatus 460 is comprisable (e.g., comprised) in a receiver device configured to receive the one or more packets. For example, the apparatus may be comprisable (e.g., comprised) in a sensing receiver and/or a positioning receiver.

Alternatively or additionally, the apparatus 460 may be configured to cause execution of (e.g., execute) one or more steps of the method 190 of FIG. 1.

The apparatus 460 comprises a controller (CNTR; e.g., controlling circuitry or a control module) 450.

The controller 450 is configured to cause handshaking of a first transmitter configuration for the first channel measurement field and a second transmitter configuration for the second channel measurement field with a transmitter of the one or more packets, wherein the first and second transmitter configurations comprise pseudo-randomly different phase and/or amplitude shifts for the channel measurement fields (compare with step 191 of FIG. 1).

To this end, the controller 450 may comprise, or be otherwise associated with (e.g., connectable, or connected, to), a transceiver (TX/RX; e.g., transceiving circuitry or a transceiver module) 480. The transceiver may be configured to handshake the transmitter configurations.

The controller 450 is configured to cause reception of the one or more packets (compare with step 192 of FIG. 1). The reception may be accomplished via the transceiver 480.

The controller 450 is configured to cause performance of measurements on the received packets for wireless sensing and/or wireless positioning (compare with step 193 of FIG. 1).

To this end, the controller 450 may comprise, or be otherwise associated with (e.g., connectable, or connected, to), a measurer (MEAS; e.g., measuring circuitry or a measurement module) 451. The measurer 451 may be configured to perform the measurements for wireless sensing and/or wireless positioning.

The performance of the measurements comprises compensation for the different phase and/or amplitude shifts. To this end, the controller 450 may comprise, or be otherwise associated with (e.g., connectable, or connected, to), a compensator (COMP; e.g., compensating circuitry or a compensation module) 452. The compensator 452 may be configured to compensate for the different phase and/or amplitude shifts when the measurements for wireless sensing and/or wireless positioning are performed.

It should be noted that features described in connection to the method 190 of FIG. 1 may be equally applicable in for the apparatus of FIG. 4B, even if not explicitly mentioned in connection thereto.

Generally, it should be understood that an exemplification of being configured to cause performance is provided by being configured to perform the action.

The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as a transmitter device, a control node, or a receiver device.

Embodiments may appear within an electronic apparatus (such as a transmitter device, a control node, or a receiver device) comprising arrangements, circuitry, and/or logic according to any of the embodiments described herein. Alternatively or additionally, an electronic apparatus (such as a transmitter device, a control node, or a receiver device) may be configured to perform methods according to any of the embodiments described herein.

According to some embodiments, a computer program product comprises a tangible, or non-tangible, computer readable medium such as, for example a universal serial bus (USB) memory, a plug-in card, an embedded drive or a read only memory (ROM). FIG. 5 illustrates an example computer readable medium in the form of a compact disc (CD) ROM 500. The computer readable medium has stored thereon a computer program comprising program instructions. The computer program is loadable into a data processor (PROC; e.g., data processing circuitry or a data processing unit) 520, which may, for example, be comprised in a transmitter device, a control node, or a receiver device 510. When loaded into the data processor, the computer program may be stored in a memory (MEM) 530 associated with or comprised in the data processor. According to some embodiments, the computer program may, when loaded into and run by the data processor, cause execution of method steps, for example, as illustrated in FIG. 1 or as otherwise described herein.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the claims.

For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely examples brought forward for illustrative purposes, and that all variations that fall within the scope of the claims are intended to be embraced therein.

The invention claimed is:

1. A method for transmission of one or more packets in a communication environment, each packet comprising one or more channel measurement fields, and the one or more packets together comprising at least first and second channel measurement fields, the method comprising:
   selecting a first transmitter configuration for the first channel measurement field and a second transmitter configuration for the second channel measurement field, the first and second transmitter configurations comprising one or both pseudo-randomly different phase and amplitude shifts for the channel measurement fields.

2. The method of claim 1, wherein a difference between average communication reception performance for the first and second transmitter configurations is less than a threshold value for communication reception performance.

3. The method of claim 1, wherein the first and second channel measurement fields are comprised in a single packet.

4. The method of claim 1, wherein the first and second channel measurement fields are comprised in different packets.

5. The method of claim 1, wherein selecting the first and second transmitter configurations comprises selecting a plurality of transmitter configurations for a plurality of respective channel measurement fields, wherein the plurality of transmitter configurations comprise one or both pseudo-randomly different phase and amplitude shifts for the channel measurement fields.

6. The method of claim 1, wherein the first and second transmitter configurations comprise one or more of:
   different mappings between transmitter chain inputs and antenna ports;
   different collections of antenna ports being active;
   different cyclic shifts;
   different phase shifts;
   different power allocations among transmitter chains; and
   different precoding settings.

7. The method of claim 1, further comprising transmitting the one or more packets using the selected transmitter configurations for the channel measurement fields.

8. The method of claim 1, wherein the transmission of the one or more packets is for communication.

9. The method of claim 1, wherein the transmission of the one or more packets is for one or both wireless sensing measurements and wireless positioning measurements.

10. The method of claim 9, further comprising handshaking the selected transmitter configurations with one or more receivers.

11. The method of claim 1, further comprising determining that a privacy enhancement mode is applicable, and wherein selecting the transmitter configurations for the channel measurement fields is responsive to determining that the privacy enhancement mode is applicable; and
   wherein determining that the privacy enhancement mode is applicable is performed by a physical layer and comprises receiving a command indicative of privacy mode applicability from a higher layer.

12. The method of claim 1, wherein selecting the transmitter configurations is for increasing security by degrading a temporal coherence of measurements performed on the one or more packets by a maliciously controlled receiver.

13. The method of claim 1, wherein the transmission of the one or more packets is in accordance with an IEEE 802.11 standard.

14. The method of claim 13, wherein each packet is one or more of: a physical layer conformance procedure—PLCP—protocol data unit, PPDU, a high efficiency, HE, PPDU, a control packet, a beacon packet, a request-to-send, RTS, packet, a clear-to-send, CTS, packet, and an acknowledgement, ACK, packet.

15. The method of claim 1, wherein the channel measurement fields include one or more of: a training field, a long training field, LTF, a short training field, STF, and a legacy preamble field.

16. The method of claim 1, further comprising localizing channel measurement fields within the one or more packets by detecting spatial mapping variations.

17. The method of claim 1, wherein the one or both of the pseudo-randomly different phase and amplitude shifts are for at least one subcarrier used for transmission.

18. A method for a receiver configured to perform measurements on one or more packets in a communication environment, each packet comprising one or more channel measurement fields, and the one or more packets together comprising at least first and second channel measurement fields, the method comprising:
   handshaking a first transmitter configuration for the first channel measurement field and a second transmitter configuration for the second channel measurement field with a transmitter of the one or more packets, the first and second transmitter configurations comprising one or both pseudo-randomly different phase and amplitude shifts for the channel measurement fields;
   receiving the one or more packets; and
   performing measurements on the received packets for wireless sensing and wireless positioning, performing the measurements comprising compensating for the one or both different phase and amplitude shifts.

19. An apparatus for controlling transmission of one or more packets in a communication environment, each packet comprising one or more channel measurement fields, and the one or more packets together comprising at least first and second channel measurement fields, the apparatus comprising controlling circuitry configured to cause:

selection of a first transmitter configuration for the first channel measurement field and a second transmitter configuration for the second channel measurement field, the first and second transmitter configurations comprise comprising one or both pseudo-randomly different phase and amplitude shifts for the channel measurement fields.

20. An apparatus for a receiver configured to perform measurements on one or more packets in a communication environment, each packet comprising one or more channel measurement fields, and the one or more packets together comprising at least first and second channel measurement fields, the apparatus comprising controlling circuitry configured to cause:

handshaking of a first transmitter configuration for the first channel measurement field and a second transmitter configuration for the second channel measurement field with a transmitter of the one or more packets, the first and second transmitter configurations comprise comprising one or both pseudo-randomly different phase and amplitude shifts for the channel measurement fields;

reception of the one or more packets; and performance of measurements on the received packets for one or both wireless sensing and wireless positioning, performance of the measurements comprises comprising compensation for the one or both of the different phase and amplitude shifts.

* * * * *